Aug. 14, 1934.  S. V. DILLON  1,970,078
PIPE COUPLING
Filed Jan. 22, 1932

Inventor
S. V. Dillon

By Robt. E. Barry
Attorney

Patented Aug. 14, 1934

1,970,078

UNITED STATES PATENT OFFICE 1,970,078

PIPE COUPLING

Stephen V. Dillon, Tulsa, Okla.

Application January 22, 1932, Serial No. 588,215

3 Claims. (Cl. 285—194)

This invention relates to improvements in pipe couplings of the bolted type, and more especially to a pipe coupling in which bolt retainers are combined in a novel manner with the bolts for frictionally holding the same against accidental detachment.

One of the objects of the invention is to combine with the bolts of the coupling, rubber washers or the like, to retain the bolts in upright position and prevent them from falling out of the coupling while the latter is being applied to the pipes that are to be coupled.

It oftentimes happens that when such couplings are being applied in a pipe line, a bolt will drop out of the coupling and into the ditch where the line is being laid, and a crew of several men is held up while the bolt is being recovered. As the bolt may drop into oil, water or mud in the ditch, obviously, valuable time is lost by the crew.
Another object of the invention is to eliminate this disadvantage.

A further object is to combine with such a coupling, bolt retainers which will enable one man to install comparatively large size couplings unaided, which would be practically impossible if he also had to prevent the bolts from falling out of the lower half of the coupling while putting on the outer half and starting the nuts on to the bolts.
A still further object is to combine with such couplings, bolt retainers which will prevent loss of the bolts while the couplings are lying along the right of way or while being shipped.

With the foregoing objects outlined and with other objects in view which will appear as the description proceeds, the invention consists in the novel features hereinafter described in detail, illustrated in the accompanying drawing, and more particularly pointed out in the appended claims.
In the drawing, Fig. 1 is a transverse sectional view of a portion of a pipe line provided with a bolted coupling and showing in section a pair of the bolt ears, one of the bolts, and one of the improved bolt retainers; the sectional portion being taken on the line 1—1 of Fig. 2.

Figure 1:
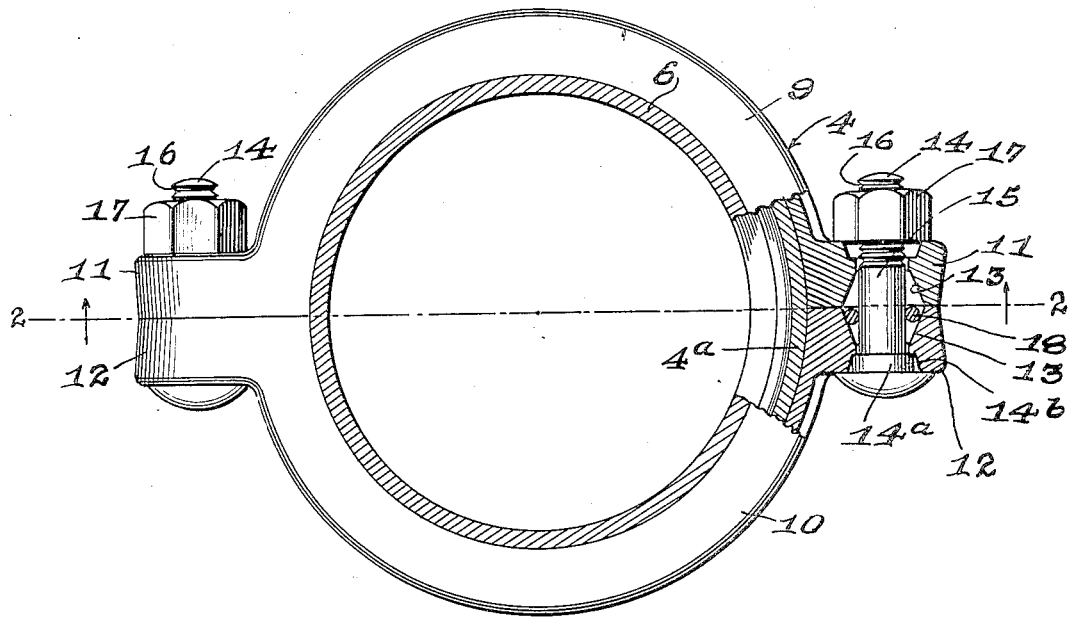
Figure 2:
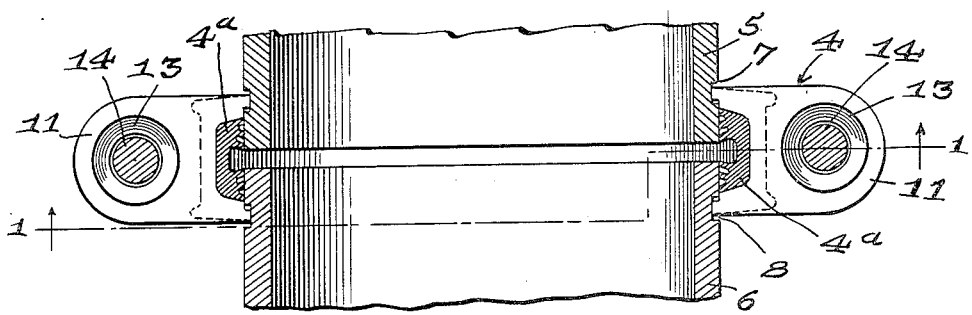
Fig. 2 is a sectional view on the line 2—2 of Fig. 1.

Referring to the drawing, 4 designates a pipe coupling of the kind shown in my Patent 1,833,-
776, dated November 24, 1931, and which coupling is employed for connecting in a fluid-tight manner, adjacent ends of pipes 5 and 6 that are provided with annular grooves 7 and 8, into which flanges of the half collars or segments 9 and 10 project.

A resilient packing ring 4a, which is channel-shaped in cross section, is held by the half collar in contact with the outer surfaces of the end portions of the pipes.

The half collars of the housing are provided with ears 11 and 12 which are provided with apertures having substantially conical portions 13. These portions face one another so that the bores through juxtaposed ears, form a substantially biconical aperture.

Bolts 14 are employed for securing the two half collars to one another, and these bolts pass through the bores of the ears and are prevented from turning by means of bosses 14a which are of non-circular shape and engage complementary surfaces 14b within the bores.

Each bolt has a cylindrical unthreaded portion 15 and a threaded portion 16; the latter portion being engaged by a nut 17, and the threaded portion being of greater diameter than the unthreaded portion.

Figure 3:
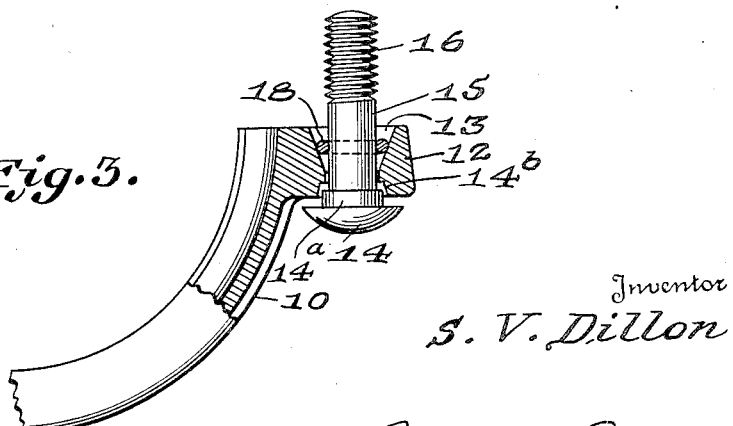
Fig. 3 is a view of a detail partly in vertical section, and showing how the bolt retainer holds the bolt in upright position, while the coupling is being applied.

With a structure of this character, I combine retainers, such as rubber rings 18 which, due to their elasticity, can expand to pass over the threaded portions of the bolts, and then contract to snugly grip the unthreaded portions of the bolts. It will also be seen that these rings occupy the substantially conical portions of the bores, and it will be noted from Fig. 3 that even when one of the coupling half collars is turned upside down, the rubber ring not alone prevents the bolt from falling out, but any falling action tends to wedge the ring between the bolt and the tapered bore 13, so that the bolt cannot accidentally fall out.

It is preferred that the rings 18 be placed on the bolts when such bolts are applied to one of the half collars, in the factory, and from that time until the coupling is employed to join pipe ends, the rings will retain the bolts in connection with said half collars.

While I find rubber retaining rings especially advantageous for my purpose, I suggest other elements may be used as equivalents. For example, I can use with the bolts, split or flexible metal rings, or rings of other resilient materials. The bolt also can be retained by a wedge forced into the bore 13 and against the bolt, or the wall of the hole in one of the ears might be made sufficiently small so that the bolt would have to be forced into the same to provide a driving fit. In other words, I can employ any suitable form of retainer which may be housed in the ear and which will frictionally engage the unthreaded portion of the bolt for preventing accidental detachment of the bolt, but which will allow removal of the bolt when desired.

From the foregoing it is believed that the construction, operation and advantages of my invention may be readily understood by those skilled in the art, and it is apparent that changes may be made in the details disclosed, without departing from the spirit of the invention, as expressed in the claims.

What I claim and desire to secure by Letters Patent is:

1. The combination with a pipe coupling comprising housing segments connected together by bolts which are removable from the housing segments, each of said bolts having an unthreaded portion, and means within the housing segments for frictionally engaging the unthreaded portions of the bolts for preventing the latter from accidentally detaching from the segment to which the head portion of the bolt is connected, said friction means including an element engaging the bolt and wedged in between the bolt and a surface of the ear.

2. A pipe coupling comprising housing segments having ears, each ear being provided with an aperture therethrough and the ears of adjacent segments being juxtaposed, a removable bolt extending through the apertures of juxtaposed ears and having a head engaging one of said ears and a threaded portion projecting from the opposite ear, a nut engaging said threads to cooperate with the bolt for holding the juxtaposed ears together, said bolt having an unthreaded portion between its head and its threaded portion, and wedging means within the ear, to which the headed portion of the bolt is connected, for preventing accidental detachment of the bolt from the last mentioned ear.

3. A pipe coupling comprising housing segments having ears, each ear being provided with an aperture therethrough and the ears of adjacent segments being juxtaposed, a removable bolt extending through the apertures of juxtaposed ears and having a head engaging one of said ears and a threaded portion projecting from the opposite ear, a nut engaging said threads to cooperate with the bolt for holding the juxtaposed ears together, said bolt having an unthreaded portion between its head and its threaded portion, and friction means within the ear, to which the headed portion of the bolt is connected, for preventing accidental detachment of the bolt from the last mentioned ear, the last mentioned ear having a substantially conical surface and the friction means engaging the last mentioned surface.

STEPHEN V. DILLON.